C. A. SMITH.
VALVE FOR GAS FIXTURES, &c.
APPLICATION FILED MAR. 13, 1916.

1,266,170.

Patented May 14, 1918.

Inventor
Charles A. Smith
by Geyer & Popp
Attorneys.

UNITED STATES PATENT OFFICE.

CHARLES A. SMITH, OF BUFFALO, NEW YORK.

VALVE FOR GAS-FIXTURES, &c.

1,266,170.	Specification of Letters Patent.	Patented May 14, 1918.

Application filed March 13, 1916. Serial No. 83,698.

*To all whom it may concern:*

Be it known that I, CHARLES A. SMITH, a citizen of the United States, residing at Buffalo, in the county of Erie and State of New York, have invented new and useful Improvements in Valves for Gas-Fixtures, &c., of which the following is a specification.

This invention relates to a valve which is more particularly designed for use in connection with gas fixtures although the same may also be used for other purposes in which conditions exist similar to those which this particular valve is designed to meet.

In indirect gas lighting systems considerable difficulty has heretofore been experienced with the means for opening and closing the gas supply conduit from which gas was conducted to the burners arranged within the inverted dome inasmuch as the latter is closed at the bottom and only open at the top to permit the principal part of the light to be directed from the burners upwardly.

It is the purpose of this invention to provide a valve device which is more particularly designed for use in connection with indirect gas lighting fixtures and which is so constructed that the same may be easily and conveniently manipulated from the underside of the dome without detracting from the appearance of the fixture as a whole.

Figure 1:
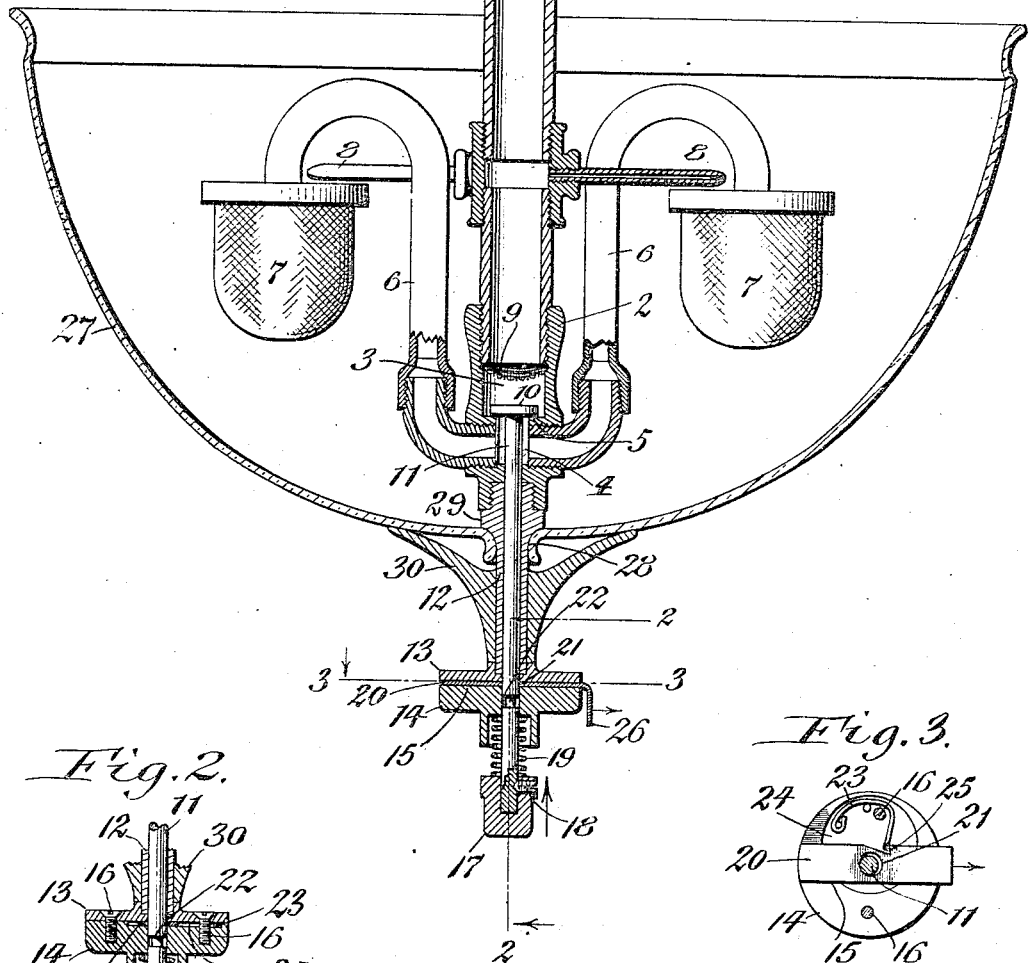
Figure 2:
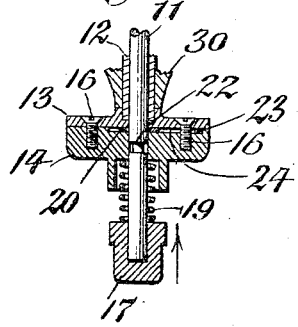
Figure 3:
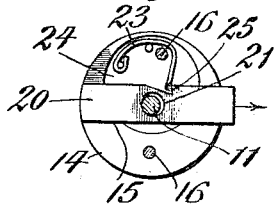

In the accompanying drawings: Figure 1 represents a vertical section of an inverted gas lighting fixture equipped with my improved valve. Fig. 2 is a fragmentary vertical section thereof taken on line 2—2, Fig. 1. Fig. 3 is a horizontal section taken on line 3—3, Fig. 1.

Similar characters of reference indicate corresponding parts throughout the several views.

Referring to Figs. 1–3, 1 represents the gas supply pipe or conduit by means of which gas is supplied from any suitable source to the fixture, this conduit in this case being represented in an upright position. On the lower end of this pipe is mounted the body 2 of the valve which latter is provided at its upper end with an inlet 3, at its lower end with an outlet 4 and between said inlet and outlet with an upwardly or inwardly facing valve seat 5 which is formed by making the inlet portion of the chamber in this body of somewhat larger diameter than the outlet portion thereof. The connection between the upper or inlet end of this body and the gas supply pipe is preferably produced by means of a screw joint, as shown.

The gas which passes the seat of the valve body may be conducted in any suitable manner to the burners of any desired character; for instance as shown in Fig. 1, the outlet end of the valve chamber is provided on opposite sides with two branch pipes 6, 6 which are provided at their outer extremities with inverted incandescent gas mantles or burners 7 to which gas is supplied by these branch pipes when the valve is open.

In order to cause these burners to become lighted the instant gas is supplied to the same one or more small pilot lights are preferably, though not necessarily, arranged adjacent to one or both of these burners, the gas for these pilot lights being supplied by means of small nozzles or jets 8, 8 which are connected with the gas supply pipe above the valve so as to be constantly supplied with gas regardless of whether the valve which supplies the branch pipes and burners is opened or closed.

A screen 9 of woven wire is also preferably arranged in the inlet end of the valve chamber above the valve seat so as to prevent any solid impurities carried in gas from reaching the valve seat.

10 represents the valve stopper which is preferably constructed in the form of a disk and movably arranged in the inlet of the valve body so as to be capable of vertical movement toward and from the valve seat for opening and closing the valve. In its depressed position the valve stopper rests upon the valve seat so as to close the main gas passage. Inasmuch as the pressure of the gas at this time assists to hold the valve stopper against its seat the liability of leakage is practically prevented inasmuch as the gas pressure at no time operates to unseat this stopper but rather aids in closing the valve more tightly. When it is desired to open the valve the stopper is raised away from its seat by means which are manually operated. These means comprise an upright operating, shifting rod or valve stem 11 which has its upper end arranged within the valve body and secured to the underside of the valve stopper while its lower end is arranged on the exterior of the valve body where it is accessible for manipulation. Below the valve stopper this rod passes through an opening formed in the lower end of the valve body and the intermediate or central part of this valve rod is guided in a guide tube sleeve 12 which receives this portion of the valve rod and is secured at its upper end to the lower end of the valve body by means of a screw joint, as shown in Fig. 1, or by other suitable means so as to practically form a downward extension of the valve body.

Means are provided which yieldingly hold the valve stopper in its closed position and means are also provided which operate to lock or hold the valve stopper in its elevated or open position. These means may be varied as to their detail construction but in their preferred form, as shown in the drawings, the same are constructed as follows:

13, 14 represent the upper and lower sections of a support or bracket which receives the lower part of the valve rod, which sections have their opposing surfaces constructed to form a horizontal guideway 15 arranged transversely to the valve rod. The sections of this support are connected with each other by means of screws 16, as shown in Figs. 2 and 3, or otherwise, and the upper section thereof engages with the lower end of the guide sleeve 12.

At its lower end the valve rod has secured thereto a head, collar or button 17 by means of a clamping or set screw 18, as shown in Fig. 1 or in any other practical way. Surrounding the lower part of the valve rod and bearing at its upper end against the underside of the lower supporting section and the upper end of the head 17 is a helical spring 19 which tends constantly to move the operating rod downwardly and press the valve stopper into its depressed or closed position.

Sliding transversely in the guideway formed between the supporting sections is a catch 20 preferably constructed in the form of a plate and provided with an opening 21 which receives the valve rod. Between the upper and lower ends of the valve rod the same is provided with a neck or reduced portion which forms a downwardly facing shoulder 22 thereon which shoulder is adapted to be engaged by one part of the edge of the opening in the catch when these parts are brought into the proper position relatively to each other and thereby retain the valve rod in an elevated position and the stopper in an open position. The catch tends constantly to move transversely in a direction for engaging one part of its opening with the shoulder of the valve operating rod by means of a spring 23 arranged in a pocket 24 formed between the supporting sections 13, 14 and secured at one end thereof to the lower supporting section while its opposite end engages with a shoulder 25 on one side edge of the catch, as shown in Fig. 3. At that end of the catch opposite to that edge of its opening which is designed to interlock with the shoulder of the valve rod the same is provided with a fingerpiece or handle 26 which is preferably constructed by bending that part of the catch beyond the supporting sections downwardly, as shown in Fig. 1.

In the position of the parts shown in Fig. 1 the valve rod is in its depressed position and the valve stopper engages the seat of the valve body so that the main flow of gas from the supply pipe through the branch pipes and to the burners is cut off. At this time the catch has been moved inwardly so as to engage the enlarged upper part of the valve rod above the neck thereof while the latter is arranged below the path of the catch. If it is desired to open the valve stopper the head or button 17 at the lower end of the valve rod is pushed upwardly, thereby lifting the valve stopper from its seat and permitting the flow of gas through the branch pipes to the burners. The instant the valve rod has been raised sufficiently to bring its reduced portion or neck in line with the catch the latter is projected transversely under the resilience of its companion spring so as to engage that edge of its opening opposite the handle or fingerpiece 26 with the downwardly facing shoulder of the valve rod, thereby automatically interlocking the catch with the valve rod and holding or locking the valve stopper in its elevated or open position. When it is desired to again close the stopper it is only necessary to push the catch inwardly by applying the pressure of the finger to its handle or fingerpiece until the edge portion of the opening in this catch has been disengaged from the shoulder 22 of the valve rod. When this occurs the valve rod is free and the same is forced downwardly not only by gravity and by the pressure of the gas on top of the valve stopper but also by the resilience of the spring 19 which is interposed between the head 17 and the lower support section 14.

It will thus be apparent that the opening and closing of the valve can be effected readily and easily and without liability of gas leaking past the valve stopper while the same is closed.

When this gas fixture and valve are used in connection with an inverted dome 27 for indirect gas illumination the latter is provided centrally in its bottom with an opening 28 so as to permit part of the valve mechanism to be extended through this dome and enable those parts of this valve which are manipulated to be operated from the underside of the dome. In the particular illustration shown in the drawings the central opening of the dome receives the guide sleeve 12 and the inner side of this dome bears against the upper enlarged part 29 of this sleeve in which position the dome is held by means of a spacing sleeve 30 surrounding the lower part of the guide sleeve and interposed between the underside of the dome and the upper side of the upper support section 13, as shown in Fig. 1. Any other suitable manner of mounting the dome on this fixture may be employed, if desired.

It will be evident from the foregoing illustration and description that those parts of the valve mechanism which are manipulated for opening and closing the gas valve are arranged on the underside of the same where they are convenient of access and therefore do not require reaching over the top of the dome or globe for controlling the flow of gas. Furthermore, these parts, as shown in the drawings, are capable of being so designed that they are neat in appearance and do not detract from the sightliness of the fixture as a whole.

I claim as my invention:

A valve comprising a body having an inlet, an outlet and an inwardly facing valve seat, a valve stopper movable toward and from said seat, an operating rod connected at its inner end with said stopper and provided between its ends with a neck or reduced portion forming a shoulder, a guide tube mounted on the valve body and receiving the central part of said rod, an operating head arranged on the outer end of said rod, a catch having an opening receiving said rod and movable transversely relatively thereto for engaging an edge of said opening with said shoulder and provided at its side with a shoulder and at one end with a fingerpiece, a support for said catch comprising upper and lower sections mounted on said rod between the guide tube and said operating head and having their opposing sides constructed to form a guideway for said catch, a spring mounted on said support between the sections thereof and engaging said catch for interlocking the same with said rod, and a spring surrounding said rod and bearing at its opposite ends against said support and said head and operating to hold said valve stopper yieldingly in its closed position.

CHARLES A. SMITH.

Copies of this patent may be obtained for five cents each, by addressing the "Commissioner of Patents, Washington, D. C."